(12) United States Patent
Odryna et al.

(10) Patent No.: US 9,258,609 B2
(45) Date of Patent: Feb. 9, 2016

(54) MULTI SOURCE AND DESTINATION MEDIA DISCOVERY AND MANAGEMENT PLATFORM

(75) Inventors: Victor Odryna, Acton, MA (US); Jeffrey R. Bacon, Shrewsbury, MA (US); Kee Hinckley, Somerville, MA (US); Gary Rose, Acton, MA (US); Richard I. Smiley, Atlanta, CA (US); Blake Ulmer, Clinton, MA (US); Preston C. Shimer, Westborough, MA (US)

(73) Assignee: TiVo Inc., Alviso, CA (US)

( * ) Notice: Subject to any disclaimer, the term of this patent is extended or adjusted under 35 U.S.C. 154(b) by 327 days.

(21) Appl. No.: 13/415,584

(22) Filed: Mar. 8, 2012

(65) Prior Publication Data

US 2012/0233640 A1    Sep. 13, 2012

Related U.S. Application Data

(60) Provisional application No. 61/450,472, filed on Mar. 8, 2011, provisional application No. 61/559,782, filed on Nov. 15, 2011.

(51) Int. Cl.
*H04N 21/462* (2011.01)
*H04N 21/482* (2011.01)

(52) U.S. Cl.
CPC ....... *H04N 21/4622* (2013.01); *H04N 21/4828* (2013.01)

(58) Field of Classification Search
None
See application file for complete search history.

(56) References Cited

U.S. PATENT DOCUMENTS

| | | | |
|---|---|---|---|
| 6,769,130 B1* | 7/2004 | Getsin et al. | 725/89 |
| 6,868,551 B1* | 3/2005 | Lawler et al. | 725/40 |
| 6,973,663 B1* | 12/2005 | Brown et al. | 725/39 |
| 8,055,528 B2* | 11/2011 | Sass et al. | 705/7.28 |
| 8,250,614 B1* | 8/2012 | Ellis et al. | 725/87 |
| 2002/0174433 A1* | 11/2002 | Baumgartner et al. | 725/58 |
| 2003/0177495 A1 | 9/2003 | Needham et al. | |
| 2005/0010635 A1* | 1/2005 | Schwesig et al. | 709/203 |

(Continued)

FOREIGN PATENT DOCUMENTS

WO    WO2010/078523    7/2010

OTHER PUBLICATIONS

European Patent Office, Application No. 12755657.9, Foreign Office Action dated Oct. 17, 2014.

(Continued)

*Primary Examiner* — Mark D Featherstone
(74) *Attorney, Agent, or Firm* — Wong & Rees LLP

(57) ABSTRACT

A platform allows viewing and sorting digital media from multiple content sources across multiple devices by title, category, series, or other sorting desired. Available content from providers may be co-mixed to display as if from a single provider. Listings may be restricted to specific providers or sets of providers, such as removing providers with paid content which the user will not access. Alternatively, listings may be prioritized based on business rules programmed into the system. Listings may be limited to those available on the current device, on another set of devices, or on all devices. Control of access to content, including playback and queuing, may be done through the interface regardless of the consumption device. This allows access to all content across all devices in a fashion desirable to the user, merging providers and devices into a seamless interface tailored for the user instead of the content or device manufacturer.

31 Claims, 32 Drawing Sheets

(56) References Cited

U.S. PATENT DOCUMENTS

| | | | |
|---|---|---|---|
| 2005/0138657 A1* | 6/2005 | Leftwich | 725/45 |
| 2006/0161953 A1* | 7/2006 | Walter et al. | 725/48 |
| 2007/0009229 A1* | 1/2007 | Liu | 386/83 |
| 2007/0074254 A1* | 3/2007 | Sloo | 725/52 |
| 2007/0276926 A1 | 11/2007 | LaJoie et al. | |
| 2008/0052739 A1 | 2/2008 | Logan | |
| 2008/0104645 A1* | 5/2008 | Kishimoto | 725/97 |
| 2009/0029687 A1* | 1/2009 | Ramer et al. | 455/414.3 |
| 2010/0070992 A1* | 3/2010 | Morris et al. | 725/32 |
| 2011/0289317 A1* | 11/2011 | Darapu et al. | 713/168 |
| 2012/0078997 A1* | 3/2012 | Evans et al. | 709/203 |

OTHER PUBLICATIONS

European Patent Office, Application No. 12755657.9, Pending Claims as of Oct. 17, 2014.

Japanese Patent Office, Application No. 2013-557876, Foreign Office Action dated Feb. 3, 2015.

Japanese Patent Office, Application No. 2013-557876, Pending Claims as of Feb. 3, 2015.

Chinese Patent Office, Application No. 201280022261.2, Foreign Office Action dated Jul. 31, 2015.

Chinese Patent Office, Application No. 201280022261.2, Pending Claims as of Jul. 31, 2015.

* cited by examiner

FIG. 3

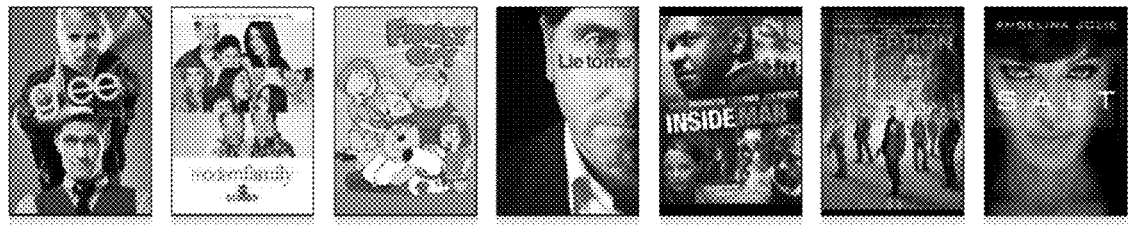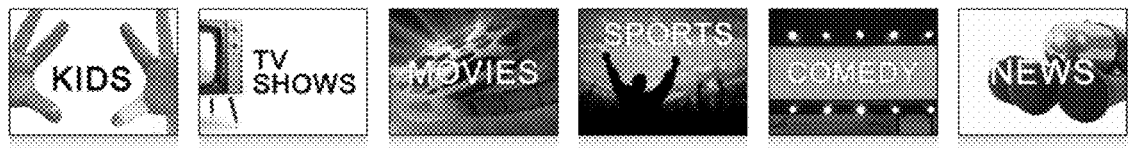
FIG. 5

| Count: 3588 | Filter by name... | | | FILTER BY: | Providers | Device | What's that? |
|---|---|---|---|---|---|---|---|
| RANK ▲ | TITLE ▲ | SEASONS | EPISODES | NEW | LAST PUBLISHED | SOURCE | |
| 1 | Rules of Engagement | 5 | 85 | 0 | 2011-01-17 | CBS | |
| 2 | CSI: NY | 1 | 9 | 0 | 2011-01-14 | CBS | |
| 3 | Jersey Shore | 3 | 29 | 0 | 2010-12-19 | Amazon | |
| 4 | The Bachelor | 3 | 43 | 0 | 2011-01-17 | Hulu | |
| 5 | The Middle | 2 | 26 | 0 | 2010-12-09 | Amazon | |
| 6 | Wipeout | 2 | 21 | 0 | 2011-01-20 | Hulu | |
| 7 | The Office | 7 | 136 | 0 | 2010-12-09 | Netflix | |
| 8 | The Biggest Loser | 8 | 96 | 0 | 2011-01-18 | Hulu | |
| 9 | Brothers & Sisters | 5 | 100 | 0 | 2011-01-16 | Netflix | |
| 10 | Family Guy | 9 | 160 | 0 | 2011-01-16 | Netflix | |
| 11 | The Closer | 6 | 89 | 0 | 2011-01-03 | Amazon | |
| 12 | Medium | 1 | 3 | 0 | 2011-01-21 | CBS | |
| 14 | The Cape | 1 | 4 | 0 | 2011-01-17 | Hulu | |
| 15 | Parks and Recreation | 3 | 34 | 0 | 2011-01-20 | Netflix | |
| 16 | 20/20 | 2 | 58 | 0 | 2011-01-19 | ABC | |
| 17 | Chuck | 4 | 66 | 0 | 2011-01-17 | The WB | |
| 18 | Pawn Stars | 3 | 88 | 0 | 2010-10-18 | Netflix | |
| 19 | Lie To Me | 3 | 46 | 0 | 2011-01-19 | Netflix | |
| 21 | Off The Map | 1 | 2 | 0 | 2011-01-19 | Hulu | |
| 22 | American Pickers | 2 | 29 | 0 | 2010-12-20 | Netflix | |
| 23 | No Ordinary Family | 1 | 14 | 0 | 2011-01-19 | Hulu | |
| 24 | V | 1 | 20 | 0 | 2010-05-18 | The WB | |
| 25 | Cougar Town | 2 | 37 | 0 | 2011-01-26 | Hulu | |

FIG. 6

MULTI SOURCE AND DESTINATION MEDIA DISCOVERY AND MANAGEMENT PLATFORM

CROSS-REFERENCE TO RELATED APPLICATIONS

This utility patent application claims priority from U.S. provisional patent application Ser. No. 61/450,472, filed Mar. 8, 2011, titled "MULTI SOURCE AND DESTINATION MEDIA DISCOVERY AND MANAGEMENT PLATFORM" in the name of VICTOR ODRYNA, GARY ROSE, KEE HINCKLEY, JEFFREY R. BACON, RICHARD I. SMILEY, BLAKE ULMER, AND PRESTON C. SHIMER, and from U.S. provisional patent application Ser. No. 61/559,782, filed Nov. 15, 2011, titled "MULTI SOURCE AND DESTINATION MEDIA DISCOVERY AND MANAGEMENT PLATFORM" in the name of VICTOR ODRYNA, JEFFREY R. BACON, KEE HINCKLEY, and GARY ROSE.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2012, ZeeVee, Inc.

BACKGROUND OF THE INVENTION

1. Field of the Invention

This disclosure relates to the field of digital media, and more specifically to listing and selecting digital media from multiple content providers and multiple content sources for multiple devices.

2. Background

As the Internet has expanded and bandwidth to homes increased, a demand for digital media, and especially video content, has grown. YouTube developed into a platform for sharing video. Traditional television networks began streaming content via the Internet. Video rental agencies, such as Blockbuster, began offering online access to content. With the expansion of video capabilities and bandwidth to mobile devices like smartphones, demand for digital media continues to grow. Many solutions have developed, driven mainly by each content provider producing ways to access its content, and devices developing device-specific interfaces to access content.

In addition to devices for accessing content, there are also many devices for sending digital media to a television. Examples of such devices include AppleTV, Boxee Box, Logitech Revue, Roku, and TiVo Premiere. Yet each different device supports access to video from different sets of content providers. For example, AppleTV supports video from Netflix, iTunes, and YouTube. Boxee Box supports video from YouTube, ABC.com, FOX.com, NBC.com, CBS.com, MLB.com, and soon will add support for Netflix. Logitech Revue supports video from Netflix, Amazon Video on Demand (VoD), iTunes, and YouTube. Roku supports video from Hulu Plus, Netflix, Amazon VoD, iTunes, and MLB.com. TiVo Premier supports video from Hulu Plus, Netflix, Amazon VoD, and YouTube. Some televisions have built-in support for access to video in a manner similar to these devices.

Other devices for accessing content, such as Verizon FiOS DVRs, may access specific and singular video sources, such as Verizon FiOS OnDemand. Computer desktops or laptops may have full access to all video sources. Other computing devices, including mobile devices such as mobile phones or iPads, may have alternative support. The iPad, for example, has browser-based access to the web but no Adobe Flash support. Video access is available from the iPad through iTunes, for example, but not through Amazon VoD.

This creates a dilemma for users who have many devices for accessing different subsets of video from different content providers. Further complicating matters, the interfaces for accessing content are highly controlled by the content providers. Access to content is typically driven through hierarchical menus populated based on information feeds provided by the content providers. On a device that provides access to multiple content providers, a user must first select a content provider, rather than browsing by type of content. After selecting the content provider, further categories are defined and controlled by the content provider. Thus, a show available from multiple content providers may be categorized differently—such as under "Family" from one content provider, "Comedy" from another content provider, "HD" from a third content provider, and "F" from a fourth content provider.

Typed searches may find the same show from all content providers, yet still separate from each other. For example, searching for "Family Guy" may produce separate results— "Family Guy" through Netflix, "Family Guy" through Amazon VoD, and "Family Guy" through Hulu. Another device might instead return "Family Guy" through Fox.com. Additionally, the search might not find all results due to inconsistencies between metadata kept by each provider. Although the same exact content may be available from multiple providers, the metadata kept often differs between providers or is incomplete. For example:

Titles are not unique. There are over 20 different movies titled "Alice in Wonderland." There are three different TV series titled "Top Gear".

Release years are not distinctive. Some sources list the theater release date, others the DVD release date, others the online release date, and others provide no date at all.

Descriptions vary greatly. Different providers often have completely different descriptions for the same movie.

Episode numbers are not distinctive. Some series, such as news programs, have no episode numbers. Sometimes, episode numbers are repeated. For example, "Dancing with the Stars Week 7" and "Dancing with the Stars Week 7 Results" are two distinct episodes, but might both be listed as season 5 episode 7.

Often there are different versions available. Sometimes, it is a simple "Director's Cut" or "Unrated Version." Other times, the durations, release years, and even titles will vary. "Star Wars" released in 1977 is the same movie as "Star Wars Episode IV: A New Hope" released in 1997.

Remakes and rereleases are very hard to distinguish. For example, "Bladerunner," released in 1982, with a duration of 113 minutes, is a special version of the movie "Bladerunner," released in 2007, with a duration of 117 minutes. On the other hand, "Ocean's Eleven," released in 1960, with a duration of 127 minutes, is not the same movie as "Ocean's Eleven," released in 2001, with a duration of 117 minutes. In both cases, the descriptions between the versions are similar.

Data is often wrong. Its common for episode numbers, season numbers, release years, and other data to be just plain incorrect. Misspellings are very common.

Formatting is often inconsistent. "The Fifth Element" and "The 5th Element" are both correct, but different. "Star Trek 4" and "Star Trek IV" are both correct as well.

Inconsistent taxonomies. Each provider uses a different set of genres and keywords to describe their content; "Drama," "Afro-Pop," "Romance," etc.

Selecting a specific content provider from the results may reduce this problem of metadata consistency, but limits the results to those available through that specific content provider. From the standpoint of a content provider, such a design is desirable because it keeps users using only one content provider's content. Each content provider wants to keep users within the content provider's available content, as it is access to such content that drives profits for each individual content provider. Device manufacturers need agreements with content providers in order to have access to content, Application Programming Interfaces (APIs), and encryption specific to each content provider. Thus (also from the standpoint of a device manufacturer) such a design is desirable because it keeps content providers happy and willing to work with the device manufacturer. This is also the simplest solution for device manufacturers, as device manufacturers can take content information directly from each content provider and display the content information without introducing further complexities.

In addition to sorting available content by content provider, available content listings are inherently linked to the viewing device. For example, a network-connected TV or DVR lists content viewable on that device. As the focus of devices is accessibility within that device to drive future device sales, the incentive is to display only content accessible and displayable on that device.

This creates an array of products which do not fully cross-integrate. No solution provides a platform that (1) lists available media across different content providers; (2) groups the media based on the end product information, rather than source feed structure; (3) lists media availability across all devices; and (4) allows control and selection from one device of any available media to play back on any available device. Furthermore, no ability exists for a content provider to program in business rules regarding the proffered choice of media for a user based on their own business desires.

BRIEF SUMMARY OF THE INVENTION

A platform is disclosed which allows viewing and sorting digital media from multiple content sources (including, but not limited to, Internet television, personal content including on local computers, video-on-demand (VOD) services, and linear television) for multiple devices by title, category, series name, or other sorting as desired by a user. Content from multiple content providers may be co-mixed to logically display to the user as if it were from a single content provider. Content listings may be reduced or tailored based on specific content providers or sets of content providers as desired by the user, such as removing content providers with paid content which the user chooses not to access. Content listings may be limited to those available on the current device, on another single or set of devices, or on all devices. Control of access to content, including playback and queuing, may be done through the interface regardless of the desired consumption device. This allows users to access all available content across all available devices in a fashion desirable to the user, merging content providers and devices into a seamless interface tailored to the individual user instead of to the content provide or device manufacturer.

In another embodiment, listings are prioritized based on business rules that are programmed into the system, potentially prioritizing one source of content over another. Media recommendations may also be provided to users based upon the same set of factors.

BRIEF DESCRIPTION OF THE DRAWINGS

In the drawings, closely related figures and items have the same number but different alphabetic suffixes. Processes, states, statuses, and databases are named for their respective functions.

FIG. 3 is an example user interface showing user account configuration including selection of paid content providers to integrate into content listings.

FIG. 5 is an example user interface showing shows, categories, and content providers as different sorting options.

FIG. 6 is an example user interface showing content listed by show series.

DETAILED DESCRIPTION OF THE INVENTION, INCLUDING THE PREFERRED EMBODIMENT

Terminology

Figure 1:
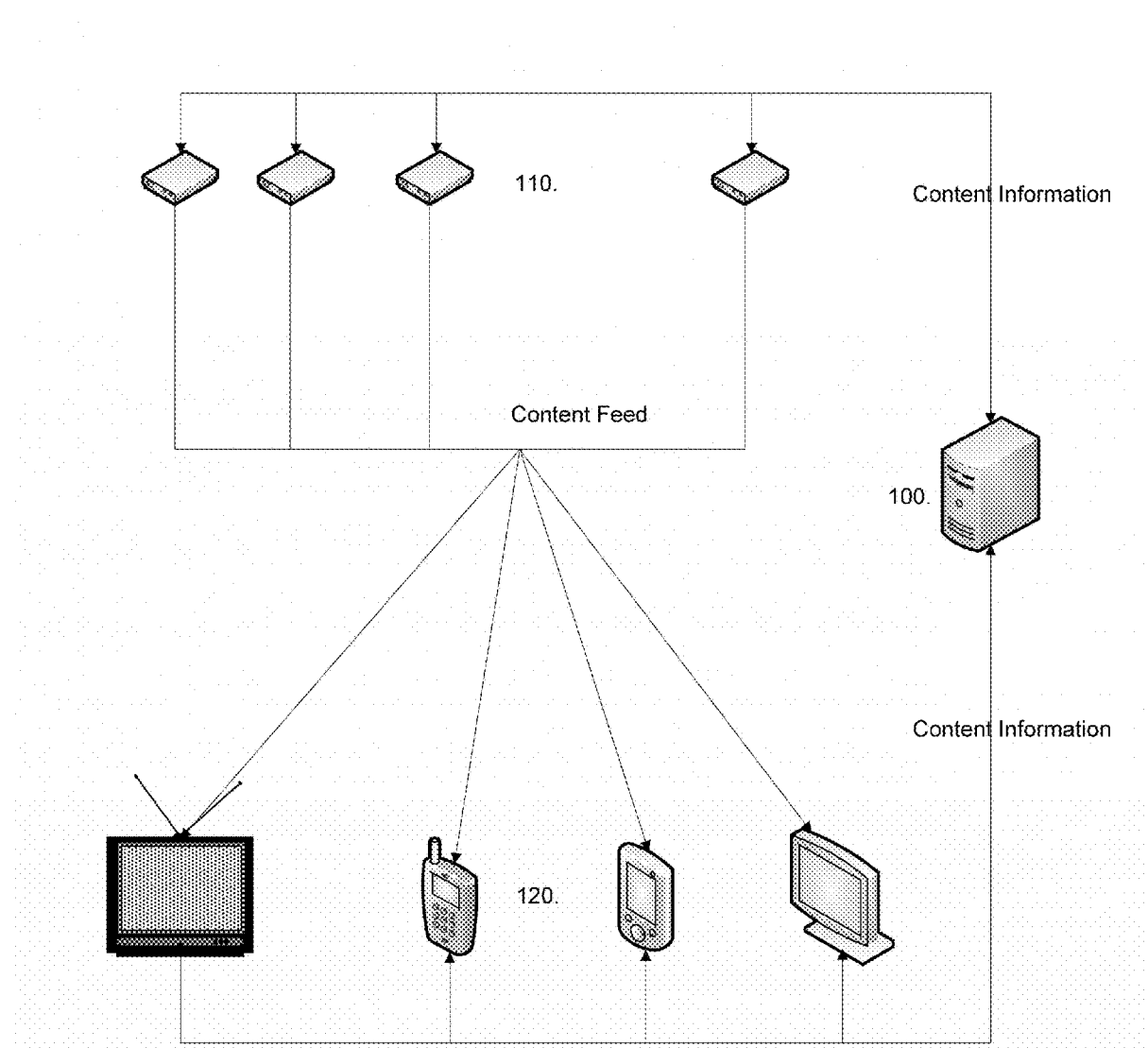
FIG. 1 is a full system diagram.

The terminology and definitions of the prior art are not necessarily consistent with the terminology and definitions of the current invention. Where there is a conflict, the following definitions apply.

access provider—entity providing video feed and/or internet to a user or user household, for example Comcast, Cablevision, or Verizon.

analog media—Media (including, but not limited to, audio, video, text, and applications) that is encoded, stored, and/or transmitted in analog format.

business rules—configuration settings that apply to available content listings and user interface appearance presented to users through a specific access provider Content—Analog media and/or digital media.

content listing—content metadata for display to a user.

content metadata—Details about a content including, but not limited to, creation date, length/duration, rating, and description.

content provider—An individual or entity, such as a broadcast or cable TV network, that provides content. Content provider examples include ABC, CBS, NBC, FOX, YouTube, NetFlix, and iTunes.

content source—From a user's perspective, a way to get content; or a thing (such as a computer, server, or device) that stores and/or transmits content. content source examples include linear television, video-on-demand (VOD) services, Internet television, DVD players, DVRs, local computers, and remote computers.

Device—A thing that is capable of outputting (including, but not limited to, playing, displaying, and exporting) digital media.

digital media—Media (including, but not limited to, audio, video, text, and applications) that is encoded, stored, and/or transmitted in digital format.

Internet Radio—Distribution of radio content via the Internet.

Internet Television—Distribution of television content via the Internet.

linear television—Television content available to a user at a specific time and on a particular channel or website. Linear television includes broadcast (over-the-air) television, cable television, scheduled pay-per-view (PPV) television, and scheduled Internet television.

Metadata—See content metadata.

Radio Content—Media (including, but not limited to, audio, text, and applications) intended to be consumed via a radio.

Smartphones—Mobile phones capable of displaying video content.

Streaming Media (noun)—Media that is constantly delivered by a content provider while being received by a user. Examples of streaming media include broadcast television, broadcast radio, Internet television, and Internet radio.

Streaming (verb)—Delivering media in the manner describe in "streaming media" definition.

Television Content—Media (including, but not limited to, audio, video, text, and applications) intended to be consumed via a television.

Television Network (or TV Network)—A telecommunications network for distribution of television content. Used also to refer to the named entities (such as ABC, CBS, and NBC) that run these telecommunications networks.

video content—Media that includes a video component.

Operation

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Figure 2:
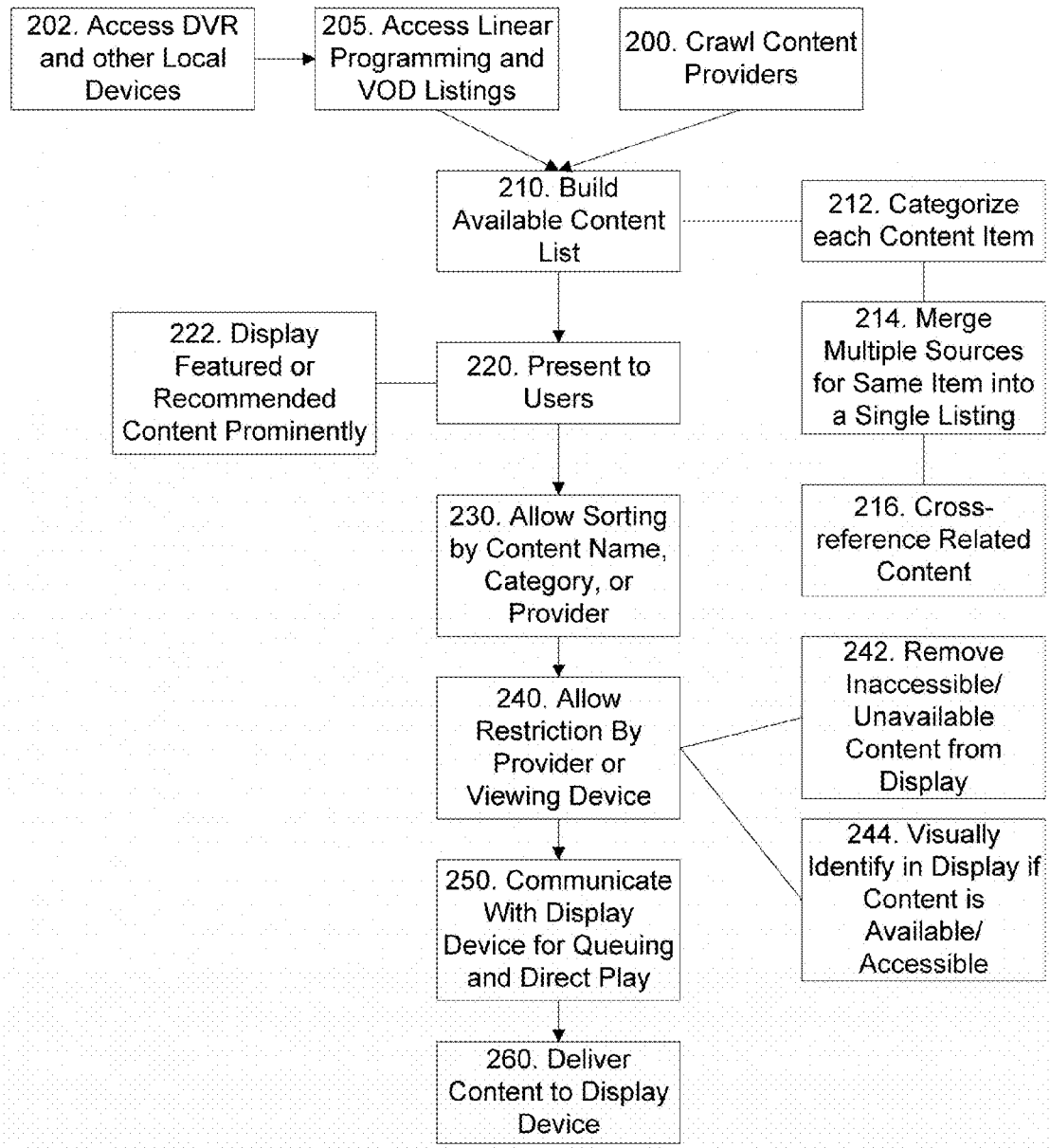
FIG. 2 is a flowchart of the process of collecting content metadata and presenting content listings.

Referring to FIGS. 1 & 2, platform server 100 collects into a database available content information from disparate content sources and/or content providers 110. Metadata regarding available content may be entered manually, requested via API access to content providers 110, or scraped through automated programs, or spiders, regularly crawling 200 public listings from each content provider. Listings are typically exposed in HTML or XML formats which are easily accessed and parsed. Content providers 110 can include any content provider which lists available content, including free content providers such as YouTube and various television network websites, subscription content providers such as Netflix, Hulu Plus, and Xfinity, and pay-per-content (PPC) content providers such as Amazon and iTunes. Any new content provider may be integrated into the listings, as the only requirement is that the available content be listed in an accessible manner. Users may select which content providers are visible to the user by default, and thus may add or remove any content providers or content sources indexed by the platform server. In addition to content providers with stored content, live content may be included. This includes any live web-based content as well as live over-the-air or live over-cable broadcasts. Such data may be accessed from online listings of linear programming, such as live television guides. Additional metadata may be pulled from user devices. For example, many DVRs and other devices have APIs allowing access 202 to content listings. By networked access to such API or networked access to a computer connected to such DVR or other device, the platform server may access 205 linear programming metadata and other available content metadata, such as video-on-demand listings, which are not available through online websites. Platform server 100 may store available content metadata, preferably in a manner that can rapidly sort and search thousands of data points such as within a database. Platform server 100 may categorize 212 each content item for sorting through various listings—title, series, content provider, possible playback platforms, geographical regions, etc. Any information about the content or the content provider may be used to identify other means of identifying and sorting the content. Multiple entries for the same content, such as multiple disparate sources providing metadata about the same episode, may be identified 214 as matches such that a single listing may be displayed for the matched content identifying all available sources. Multiple entries for related content, such as different episodes within the same series, may be cross-correlated 216 for ease of access to related content. Once platform server 100 has built 210 or collected data points for available content from content providers, it can present 220 this information to users in a manner most beneficial to the user.

Users consume content on devices 120. Devices may include traditional televisions, Internet-enabled televisions, mobile devices (e.g. phones, smartphones, iPods or Atrix), hand-held computers (e.g. iPads or Xoom), or traditional computer or laptop devices. Other devices will likely be developed which can serve as consumption points, with the main need being ability to access video and a display capability. To operate with platform server 100, the consumption device must be networked to or receive video from a device networked to platform server 100. Such network connection most commonly may be over the Internet.

Users may receive, sort 230, and select content listings through platform server 100. Once content is selected, it may be streamed or delivered 260 from content provider 110 to display or consumption device 120.

Figure 4:
FIG. 4 is an example user interface showing search and different ways to view content.
Figure 7:
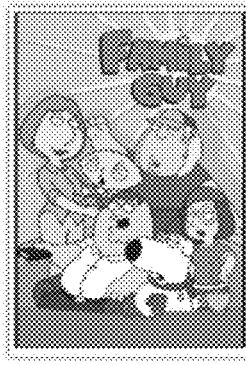
FIG. 7 is an example user interface showing selection of a specific series with individual episodes accessible from different content providers.

Users may access platform server 100 to view all available content. A user interface is preferably provided fully in HTML without reliance on plugin technology, such as Flash, or hardware specific programs, in order to provide a cross-device interface. Thus access may be through web browsers on computers, Internet-enabled televisions, playback devices such as Internet connected DVR's, playback devices, or video game hardware platforms, or mobile devices such as phones. No download or special software is needed beyond the web browser. An account may be set up to automatically configure some filtering of content. Although a main purpose is to merge and present content from all content providers, if a user has no access to paid content seeing such content displayed may be undesirable. FIG. 3 shows a sample interface where a user may configure an account to exclude 240 selected paid content providers. Global settings may be configured for which content providers and type of content to display by default. Individual content providers may be enabled or disabled, whether they are free or paid content providers. In addition, some content providers have multiple types, such as both free and paid, multiple formats of content, and multiple subscription packages, all of which may be enabled or disabled for default display. In addition to enabling/disabling specific listings, the form of display may be adjusted. For example, instead of disabling 242 content to which the user lacks access, such content may be displayed 244 in a grayed out fashion to allow browsing the content while indicating it is not available to the user. In accessing content, different presentation formats may be desired by different users. FIG. 4 shows a sample entry interface allowing search along with links to browsing, listing series of content, content categorized as movies, along with other features. FIG. 5 shows a sample user interface for browsing content. Featured, suggested, or recommended content may be displayed, along with categories for type of content, as well as content from specific content providers. While a purpose is to merge content metadata from multiple content providers into a single content listings, as users may desire content from a specific content provider such sorting is also available. Additional categories may be configured for browsing choice, such as by device, language, or other criteria configurable by the user. FIG. 6 shows a sample user interface listing available content categorized within series. Further selection can be made by browsing available listings, sorting be various content headers, filtering by name, or further reducing by selecting content provider or viewing device. Restriction by content provider may be desirable to selectively move between paid or free content, and selection of device may be desirable to limit displayed choices to those that will be able to be viewed. Such restrictions and selections may also be configured globally to apply as the default display. FIG. 7 shows a sample user interface for a television series. In this case, the series is listing seasons that are available and individual episodes within each season. Different episodes are available from different content providers—some episodes being free, some having a cost, and some available from multiple content providers. Again, further restriction is possible by content provider or device to further tailor display of available content. Selections within an individual episode include begin play, save to a personal or device queue, mark as a favorite, or other actions desirable within a user's account.

Because the interface is designed for compatibility with all devices, direct play options are available within the interface to start playback if playback is possible on the current device. Yet not all content is available on all devices. Some content playback requires supported playback plugins such as Flash. Other content playback requires supported video codecs or decoders which are not available on all devices. Other content playback may be limited to a specific playback device due to digital rights management restrictions. Thus users may want to limit 240 the displayed content to content playable on the current device or to a set of devices. Such settings may be made globally for default behavior or individually adjusted during individual access sessions. Yet in many situations, users may want to browse content available on a specific but different device. For example, while watching content on one television browsing next content may be desired on an alternate device without interrupting or altering the current playback. Additionally, remote browsing such as selecting content while away from home to be viewed after returning home may also need to select content playable on another device. For this reason, it is desirable to display all available content, a selected subset of all available content, or allow limiting display to only content or a subset of content accessible from the current or another specific individual device. Again, disabled content may be configured to be fully removed from presentation or to appear grayed out to indicate the difference with available, accessible, or selected content. Configuration for devices may be done within user account settings. Playback for a specific device may be automatically triggered from another device if the playback device is operating a program or has access set up to allow control from other devices. Such control could be wifi communication 250 from a mobile phone which replaces need for a traditional television remote control. Alternatively, queues may be configured such that the displaying device may access the next content in the queue and move to that content automatically or upon manual selection after the current content playback ends.

In addition to access to content from traditional and Internet content providers, users may configure access to private or local content. For example, this may include content stored on a DVR, DVD or other playback device including video cameras, or content stored on computers, computing devices, or networked devices such as cloud storage. Information about such content may be input by the user, or included in descriptors already associated with the content. Information may be stored in the platform server, or stored locally on users devices. Local storage of the local content information means that access to the local storage device may be needed to access the content information. Playback may be limited to the local device on which the local content is stored, or available on multiple devices if streaming/distribution of the local content is available from where it is stored. For example, an unencoded video file stored on a computer may be playable on any accessing device able to connect to the computer and access the file. In contrast, video stored on a local DVR might be limited to playback on television devices connected to that DVR.

Figure 8:
FIG. 8 is another example user interface showing search and different ways to view content including live content and local content.
Figure 9:
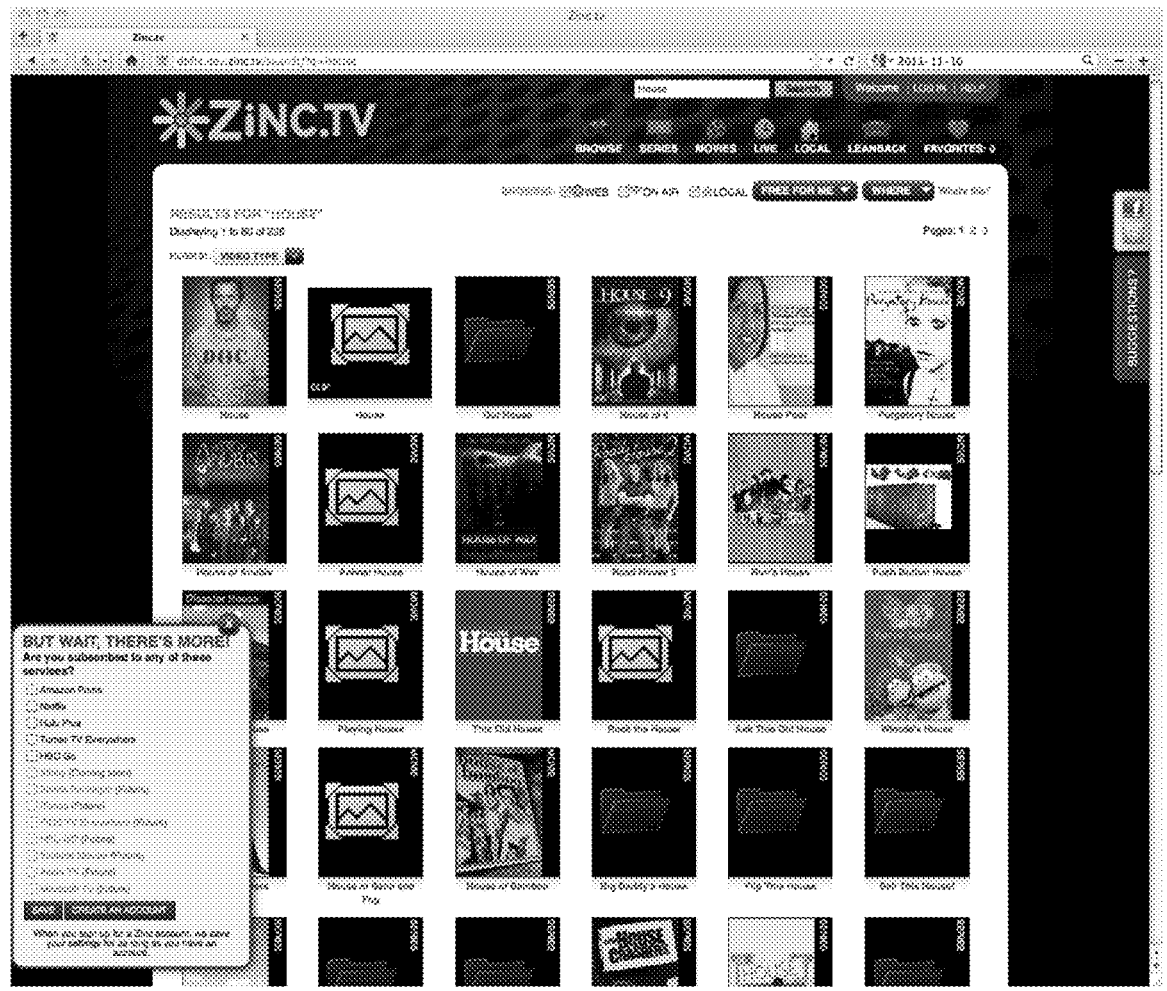
FIG. 9 is an example user interface showing search results with a pop-up option to configure content providers.
Figure 10:
FIG. 10 is an example user interface showing selection of a specific series with individual episodes accessible from different content providers, and a filter popup selected to choose between showing all content providers or showing all free or subscribed content providers.
Figure 11:
FIG. 11 is the example user interface of FIG. 10 with a filter popup selected to limit content to displayable on specific devices.
Figure 12:
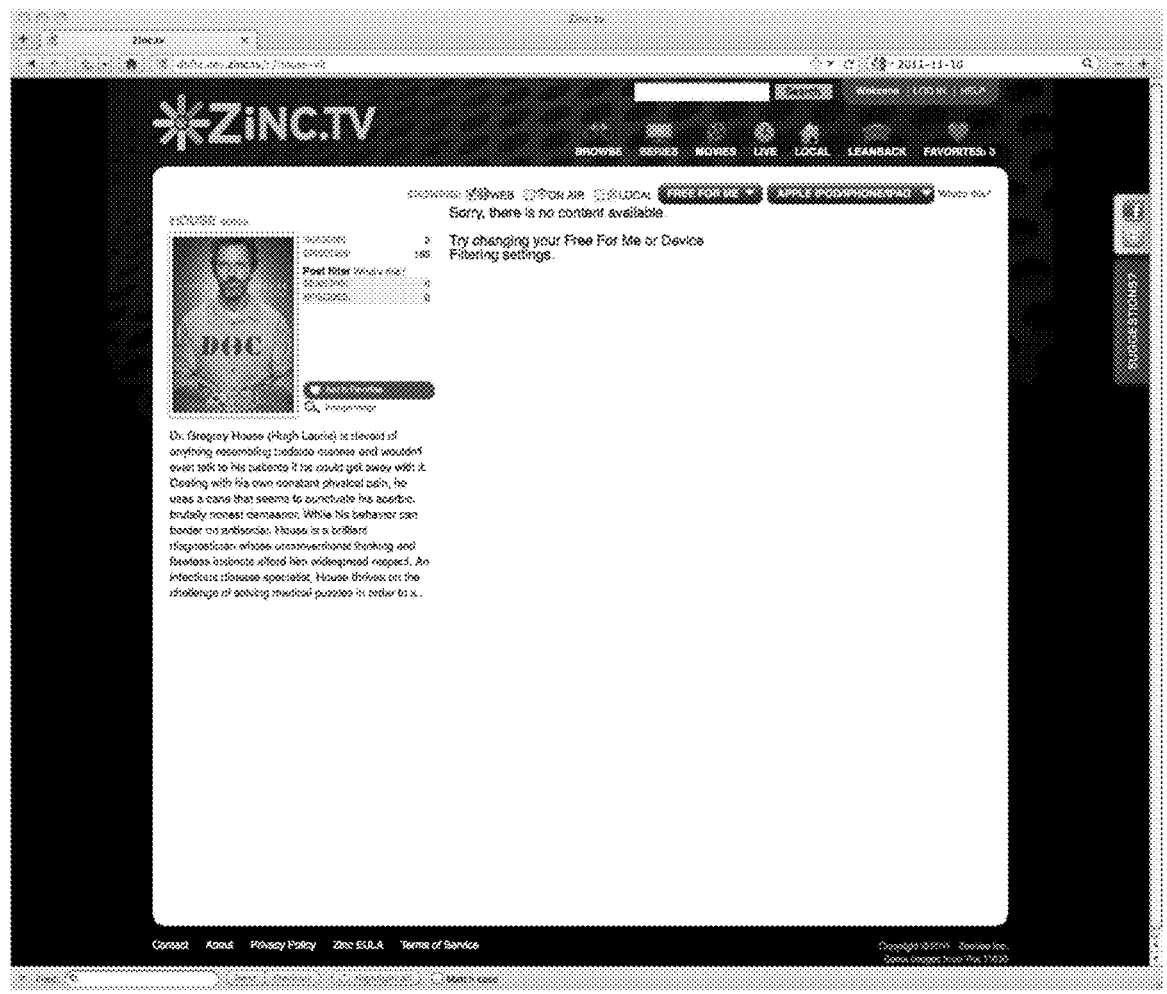
FIG. 12 is the example user interface of FIG. 11 with iOS devices selected.
Figure 13:
FIG. 13 is the example user interface of FIG. 11 with MAC computer devices selected.
Figure 14:
FIG. 14 is an example user interface with a specific single episode selected.
Figure 15:
FIG. 15 is an example user interface viewing favorites.
Figure 16:
FIG. 16 is an example user interface showing results after browsing to the Kids section.
Figure 17:
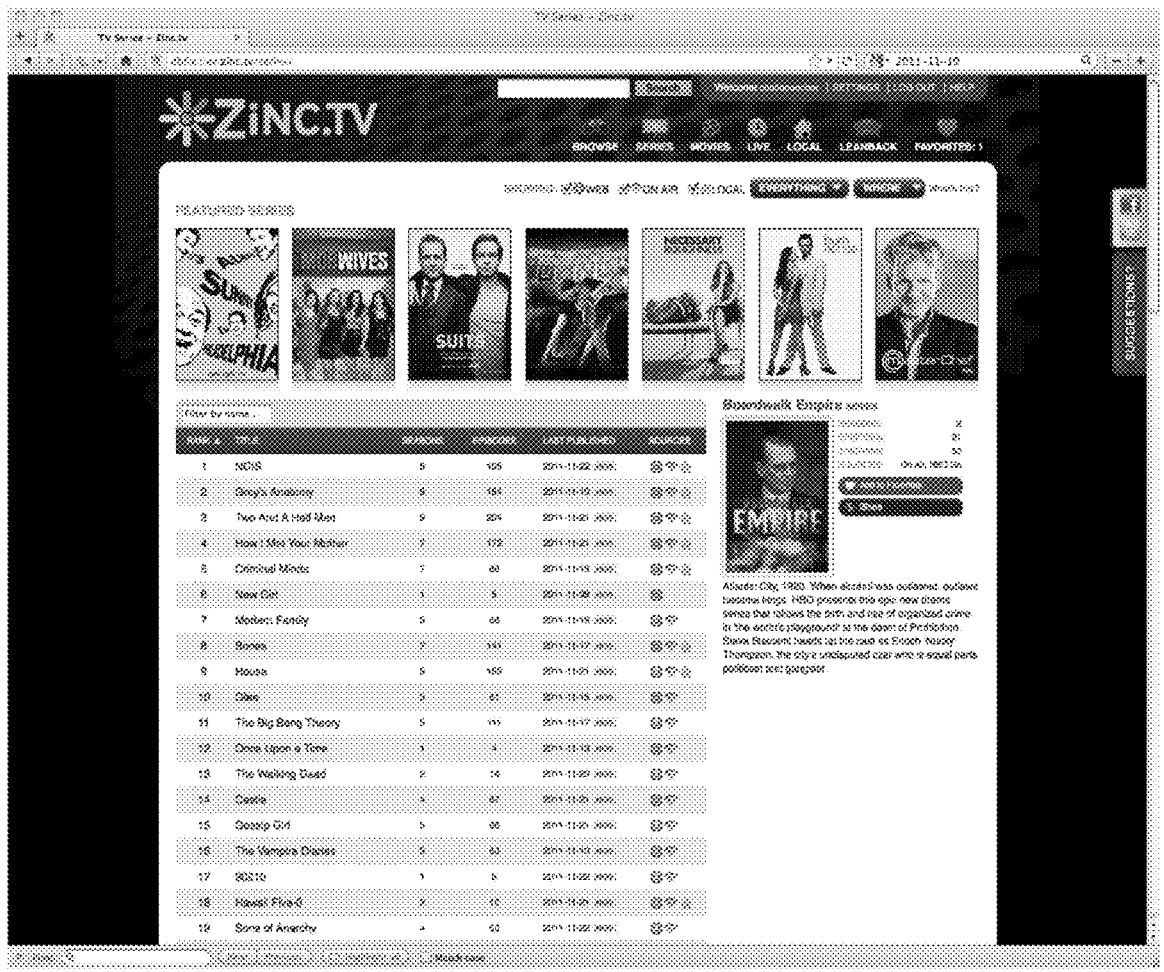
FIG. 17 is an example user interface showing series listings displayed.
Figure 18:
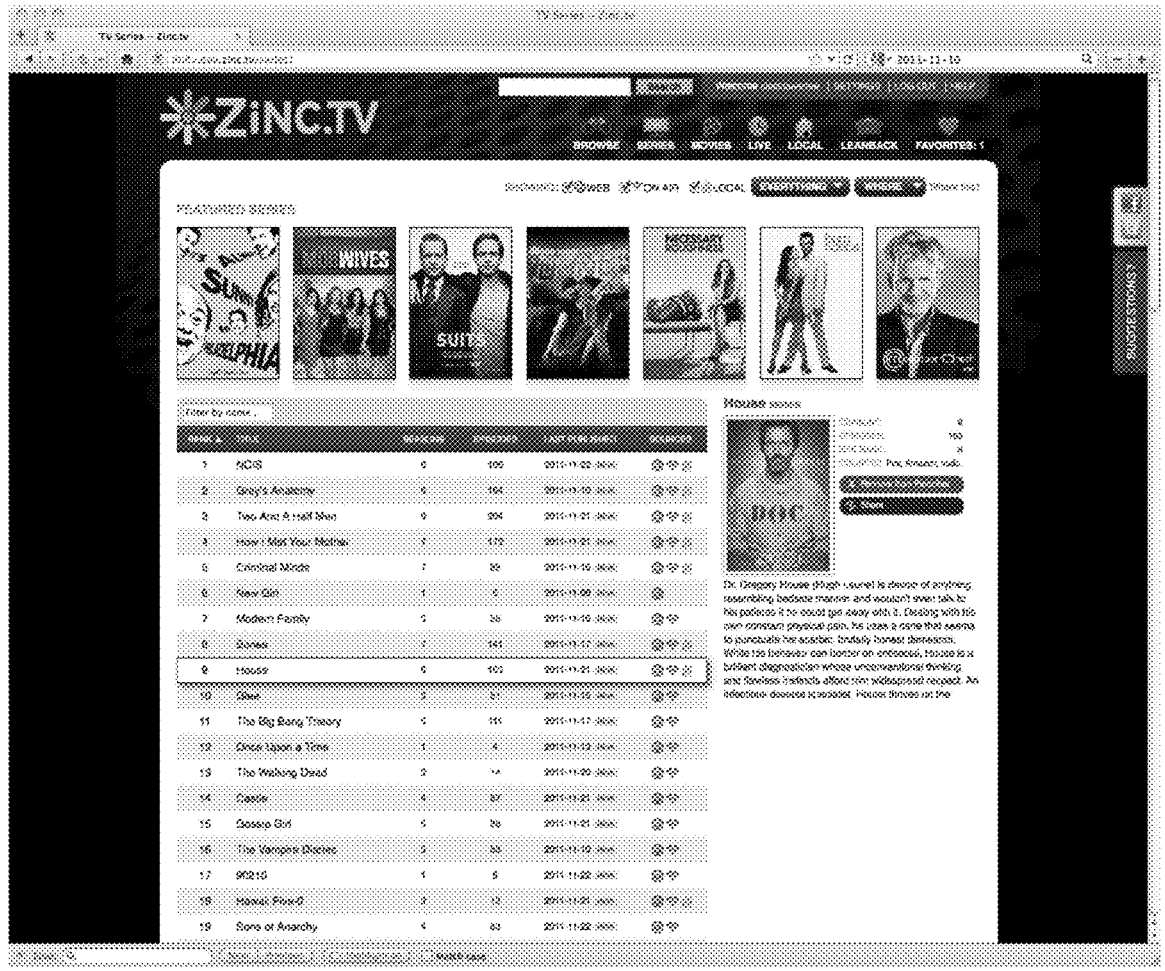
FIG. 18 is the example user interface of FIG. 17 with one series activated via mouse-over.
Figure 19:
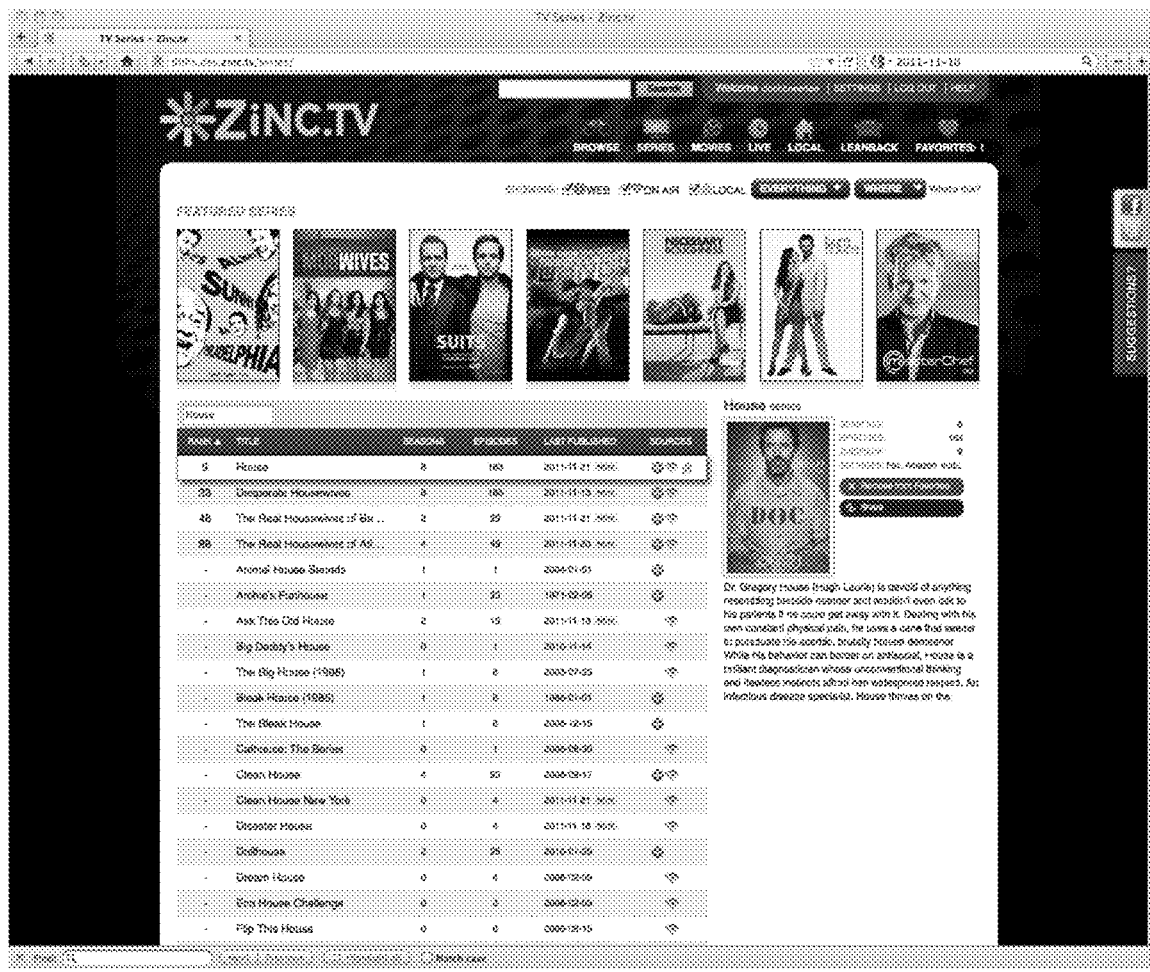
FIG. 19 is the example user interface of FIG. 17 with a search term applied to the listed results.
Figure 20:
FIG. 20 is an example user interface showing movie listings displayed.
Figure 21:
FIG. 21 is an example user interface showing live listings displayed.
Figure 22:
FIG. 22 is the example user interface of FIG. 21 showing new programming.
Figure 23:
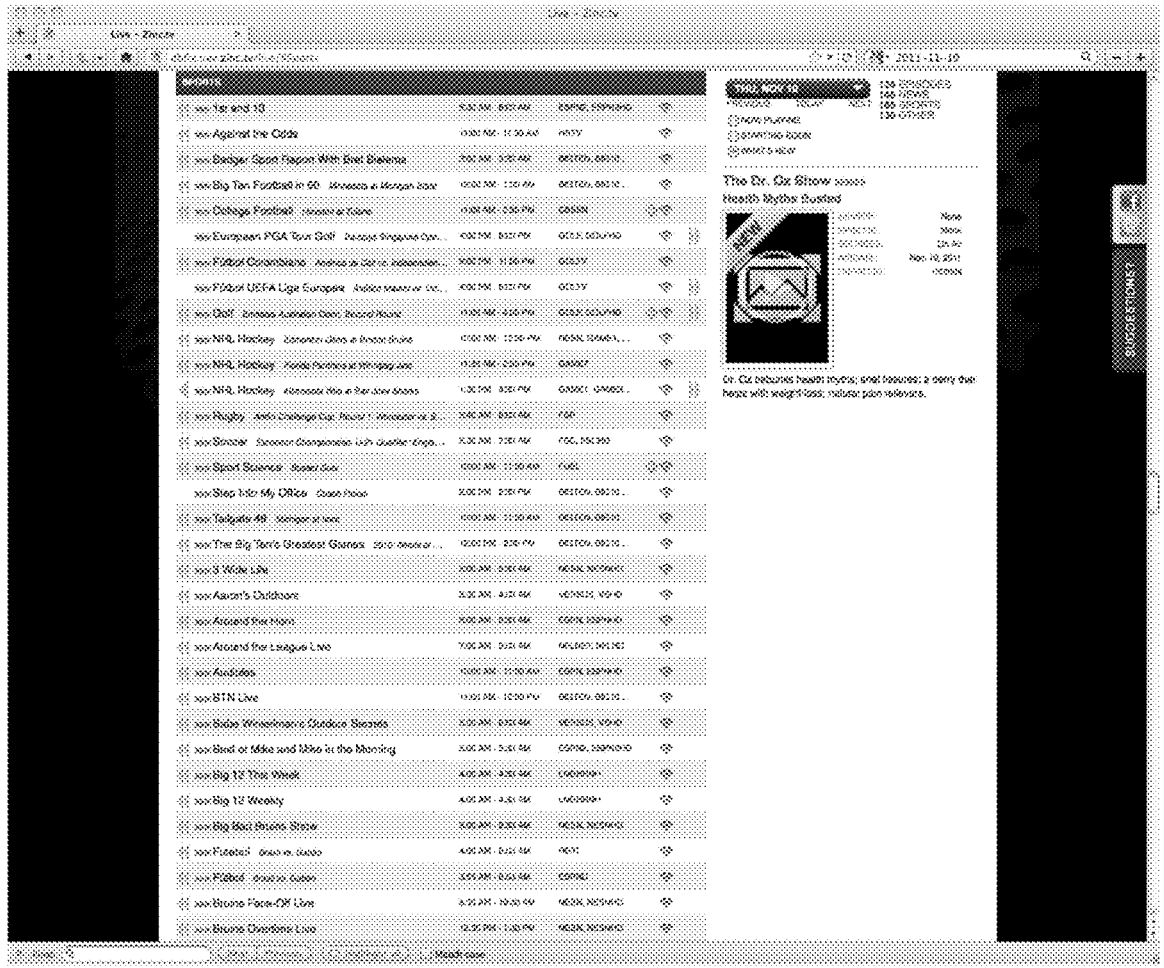
FIG. 23 is the example user interface of FIG. 21 showing new sports programming.
Figure 24:
FIG. 24 is an example user interface showing local content.
Figure 25:
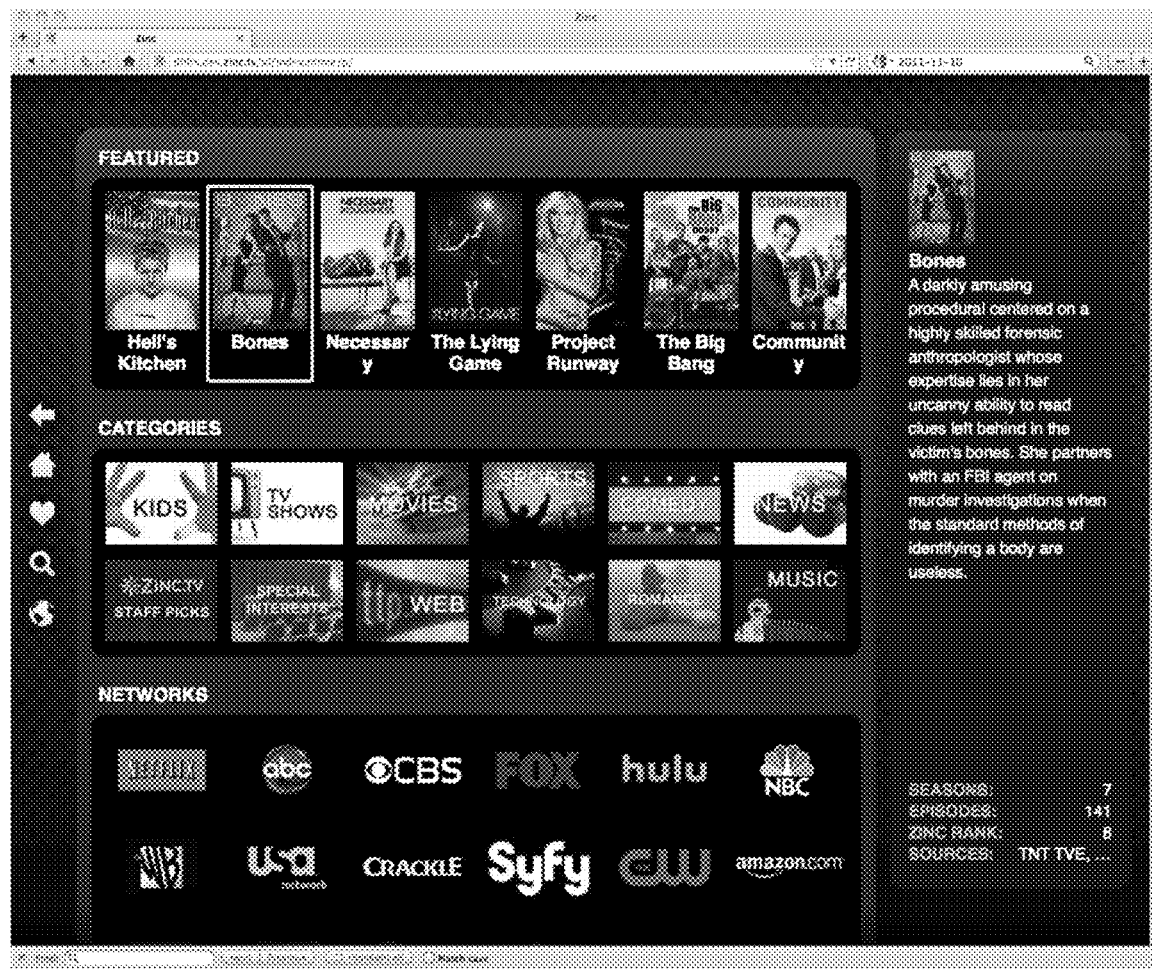
FIG. 25 is an example user interface organized for display on a television.
Figure 26:
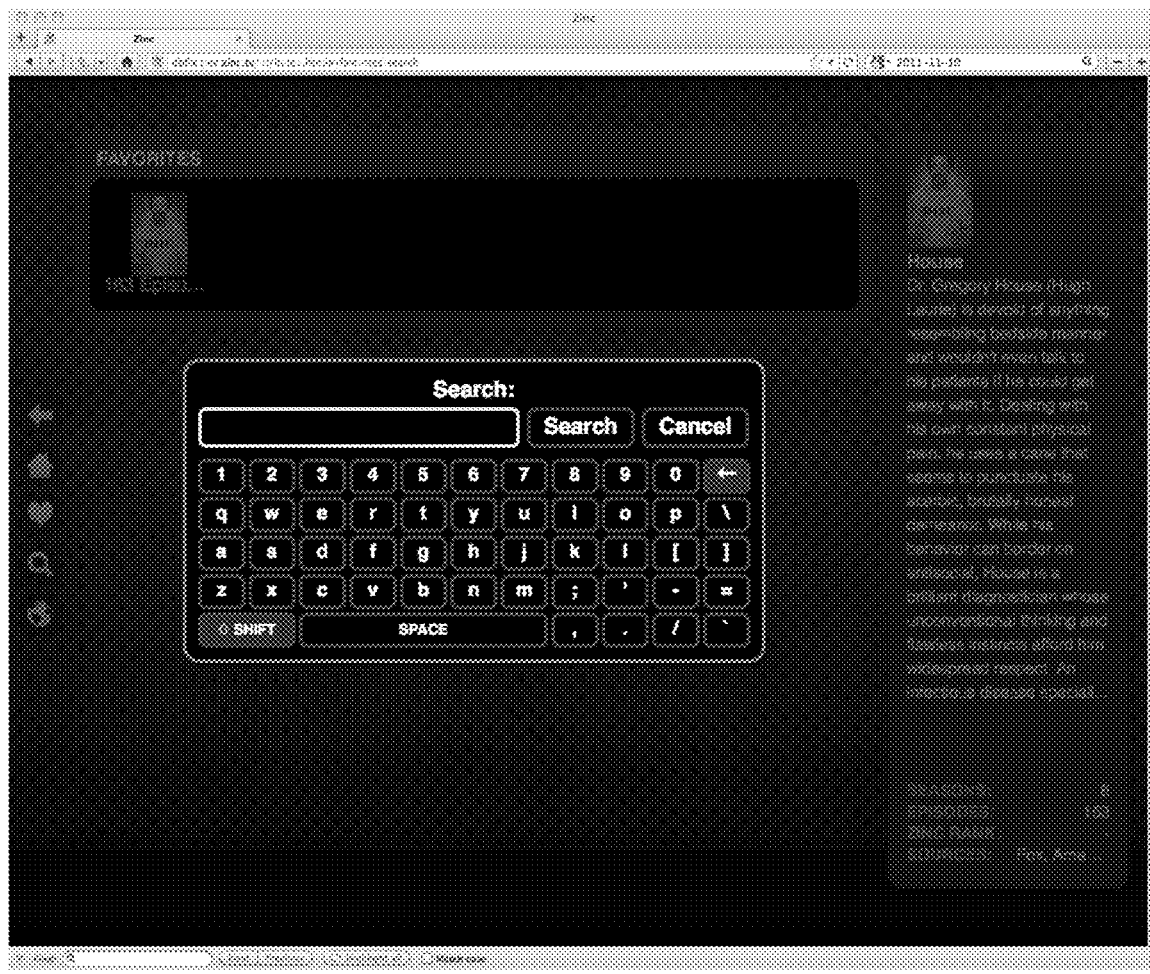
FIG. 26 shows a input box useful for search within a user interface such as shown in FIG. 25.

FIG. 8 shows a browse interface with additional buttons to access live content and local content. Both live and local content may be indexed like other content based on content metadata about shows or broadcasts. FIG. 9 shows the results of a search for specific content. Controls are added to filter results to one or more of "web" content which includes an content coming over an Internet feed, "on air" content which includes traditional television feeds such as antenna, cable or satellite, and "local" content. FIG. 10 shows selection of a specific series with a filter opened for selection between "Free for me" and "Everything" content. With "Everything" selected, applicable content from any content provider feed will be displayed. With "Free for me" displayed, available content will only include from free content provider feeds or paid content provider feeds to which the user has already subscribed. FIG. 11 shows selection of a specific device filter. FIG. 12 shows the results after selection of a specific device, in this case no playable content on iOS devices. FIG. 13 shows selection of a different device, in this case resulting in available content for play on MAC computers. FIG. 14 shows selection of a specific episode with playable content. Web content is ordered by price, with the lowest cost option (free) coming first. On Air listings follow with time of next showing and ability to configure a reminder about the show or set up a recording. Web content and on-air content that is actively playing may include links to go directly to a playback view of the content or to control a specific viewing device. FIG. 15 shows that any content may also be listed and accessed through a user configured Favorites section. FIG. 16 shows browsing to a specific category, in this case Kids. Featured content may be displayed, as well as any sub-selection within the category. In this case there are different genres and content providers selectable to reach further into the category. Other listings, such as the category within a content provider feed, may be displayed as well if applicable. FIG. 17 shows a listing of series. Series are ordered by rank. Rank is calculated by combining the rank or rating of a series from content provider sites and third party review sites, such as IMDB and Rotten-Tomatoes. Featured selections are displayed 222 at the top above the listing. FIG. 18 shows behavior on activation of an individual listing, such as by mouse-over. The selection may be raised or highlighted, with series specific information also displayed. Also visible in all listings are icons representing sources of the content. Matching the filters above, web, live, and local icons are displayed if the content is available through such a source. These icons may further indicate if the content is available to the user, in which case the icon is in color, or available only through a subscription not currently accessible by the user, in which case the icon may be grayed out. Alternatively, or if the displayed list is already limited to display "Free for me" or content only from accessible sources, the icons may be used to represent available devices. For example, grayed out icons may represent the content is available but not on the current or selected device, while icons in color represent content is available for viewing on the current or selected device. FIG. 19 shows searching within the listing removes all non-matches, but retains the rank ordering of the remaining results. FIG. 20 displays movies in a display similar to the series displays. As movies are individual, the specific movie information display may include direct action options, such as "Play," which are not included within a series information display. FIG. 21 shows the same interface used to display live content. In a live view, a default behavior for icons may be to indicate availability of related content. For example, an icon representing the web may be present next to any content in the live listing if that content is available on the web. Such icon may be displayed in color to indicate an exact content match is available on the web, and displayed as gray if an exact match is not available but similar content, such as a different episode of the same series, is available. A similar gray/colored icon may used to indicate if exact or similar content is also available locally. Within the live listings, favorite or recommended content may be displayed first or at the top. Content may be ordered based on user preferences, sorted by name, content provider, content category, or ordered based on any available rankings applicable to the content. A date and time selection interface, such as a drop-down selector with previous and next time buttons, may select the time displayed for live content. Further live-specific options include "Now Playing," which displays content live at the selected time, "Starting Soon" which displays content starting at or within the next time period (30 minutes or 1 hour) of the current time. FIG. 22 shows "What's New" selected, which reduces the displayed live content to new episodes or new content. Being "new" content is an identifiable element in content metadata about live video content, and is also displayed within the interface as a "new" tag on individual content items. Live content may also be sorted and viewed by type. FIG. 23 shows selection of "Sports," which adjusts the display to list live sports content. Other categories, such as, for example, "Episodes" or "News," may alternatively be selected. Grouping by such categories even within full listings may be enabled for more useful sorting of the full listings. FIG. 24 shows Local content, which in this example is content recorded on a TiVo. FIG. 25 shows an alternate interface to the same content, reconfigured into a format designed for television screens. Such interface may function on computers via mouse control, or be easily adapted to television display and control through a remote control with right/left/up/down movement of selectable items. FIG. 26 shows an input box in such interface, with keyboard displayed selectable through a standard TV remote control.

To present content from multiple sources to users in a seamless, unified, fashion, inconsistent metadata must also be correlated. Such correlation is done by software on the server with input and controls from system administrators with access to a server user interface. As data is acquired by the server, be it through input, API calls, or scraping available web information, the data is normalized automatically by server software to correct common abnormalities. For example, roman numerals are converted to decimal notation, punctuation is removed, whitespace is added or deleted for consistency, and common notations such as "(unrated)" are removed. Both the normalized and original data is stored in the database. After normalization, a variation software process is run to create multiple variations that could be used to identify the same content, such as phonetic pronunciation of the title to account for misspellings, stemmed versions of the title to correct pluralization problems, letter-pattern variations to account for simple typos, or other possible signatures if available. The multiple variations are similarly stored in the database, allowing efficient generation of a list of possible matches for any item in the system.

Once a list is created of possible matches for an item, each possibility Is analyzed using multiple metadata heuristic software to develop a certainty. For example, a movie can be compared based on title, release year, air-date, description, and rating. For each piece of metadata, a certainty level is determined. A character-for-character match on a title is considered stronger or higher certainty level than just a phonetic match. Duration matches might be exact, off by just a few minutes, or off by a large margin. Release years that are only one year apart are considered stronger than those 10 years apart. Common words in the descriptions are considered valuable information based on overall language word commonality. Once certainty for each piece of metadata is assigned, an overall level of certainty is generated for the match based on the certainty of the multiple pieces of metadata. If the title match is strong, the release year match strong, but the duration match weak, it is likely an overall medium level certainty match. These heuristics are optimized based on hundreds of thousands of items of input data and data testing and standard statistical certainty optimization.

Figure 27:
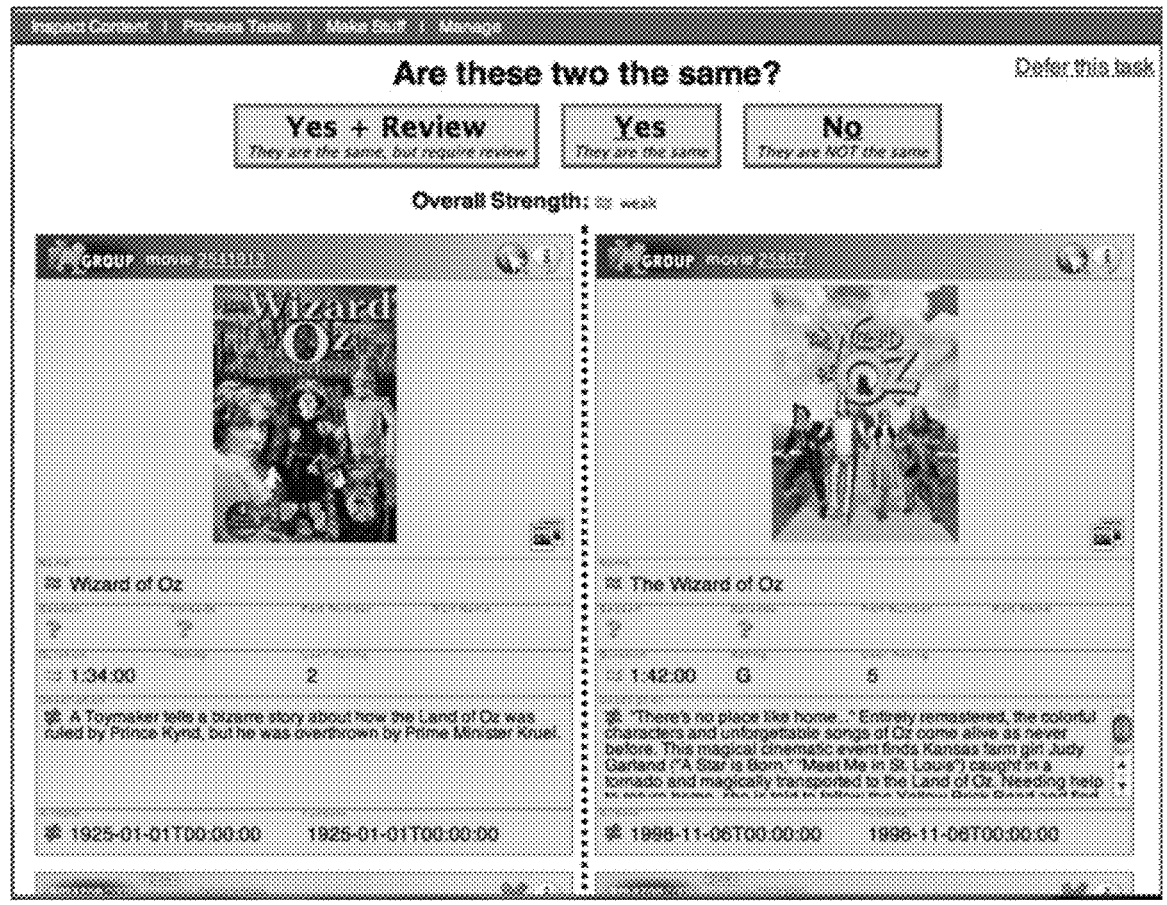
FIG. 27 shows an administrator interface for identifying matched content

Once the certainty of a match is determined, the system must choose how to handle the match. If a match is very weak then it can be safely discarded by the server software, If a match is very strong then it can safely considered a perfect match by the server software, and recorded as an exact-match correlation in the database. In some cases, however, there simply isn't enough certainty one way or another. To deal with such situations, human-assisted automation may be used. For each instance of uncertainty, the system will automatically create a task for server administrators. Referring also to FIG. 27. These tasks may be viewed and processed quickly using a web-based server administrative user interface tool that presents all the data and asks simply, "Are these two the same?", and expects a simple "Yes" or "No" response. Minimally-trained administrators can process these tasks a rate of about one task every 5-15 seconds, or 240-720 tasks an hour. During days where the system only polls previously polled sources for changed content, typically 0-50 new tasks are generated. Importing a new mega-site (for example, integrating a brand new movie rental site with 100,000 movies) for the very first time may generate a few thousand tasks, but even then the processing only takes several hours of effort to correlate all content. Administrator performance may be tracked, such as average time to make a decision and percent rate at which yes/no decisions are later overturned. The result is fast, efficient, and accurate correlation.

Figure 28:
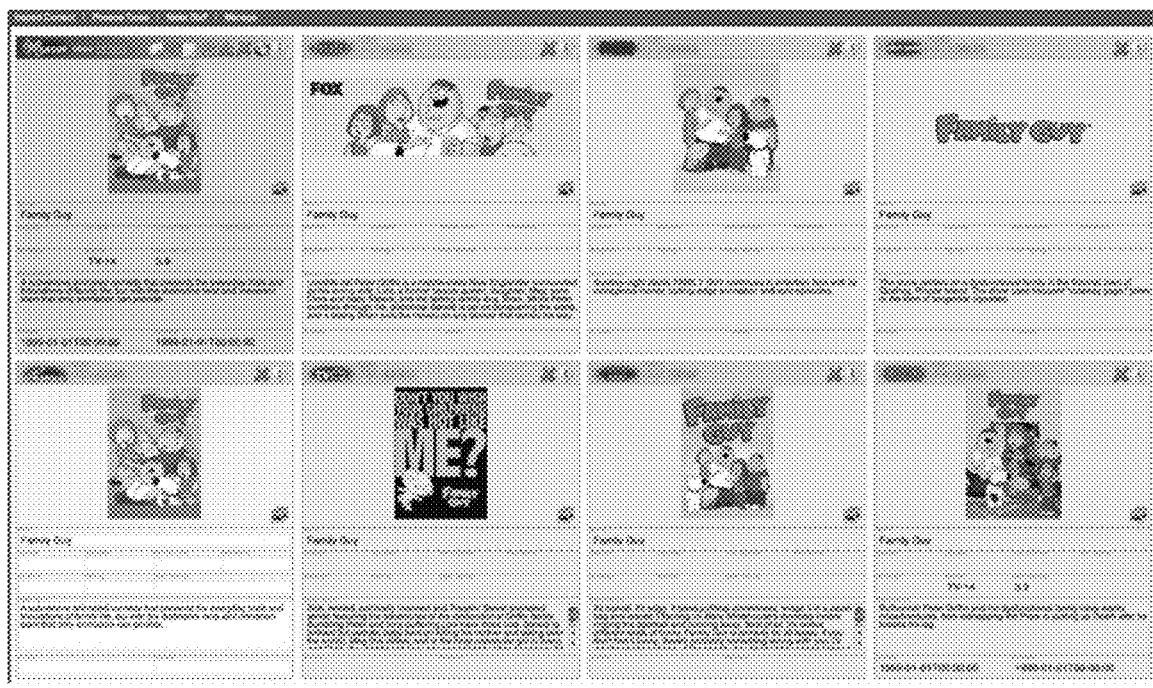
FIGS. 28 and 29 show an administrator interface for editing stored metadata about content.
Figure 29:
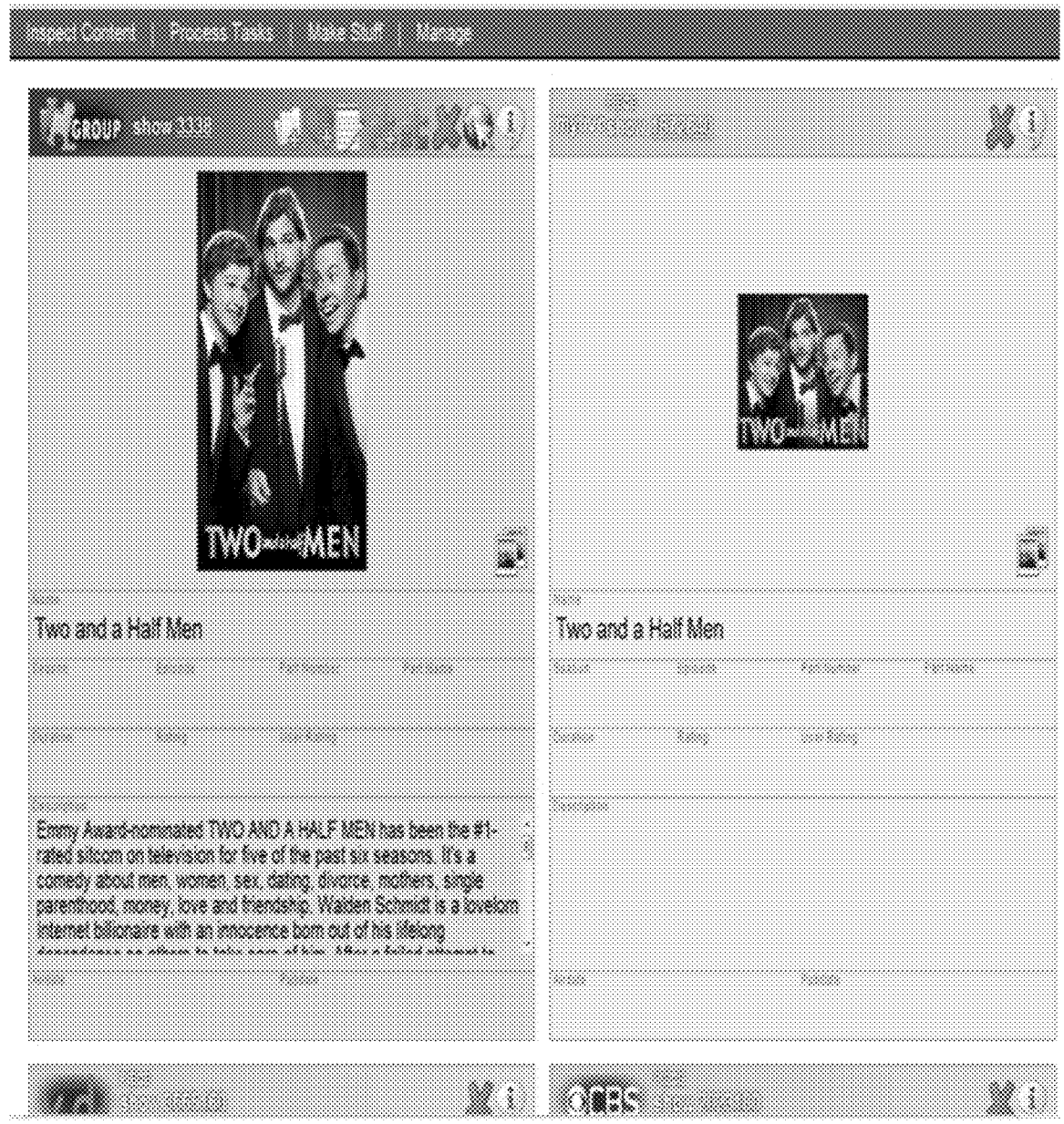
Figure 30:
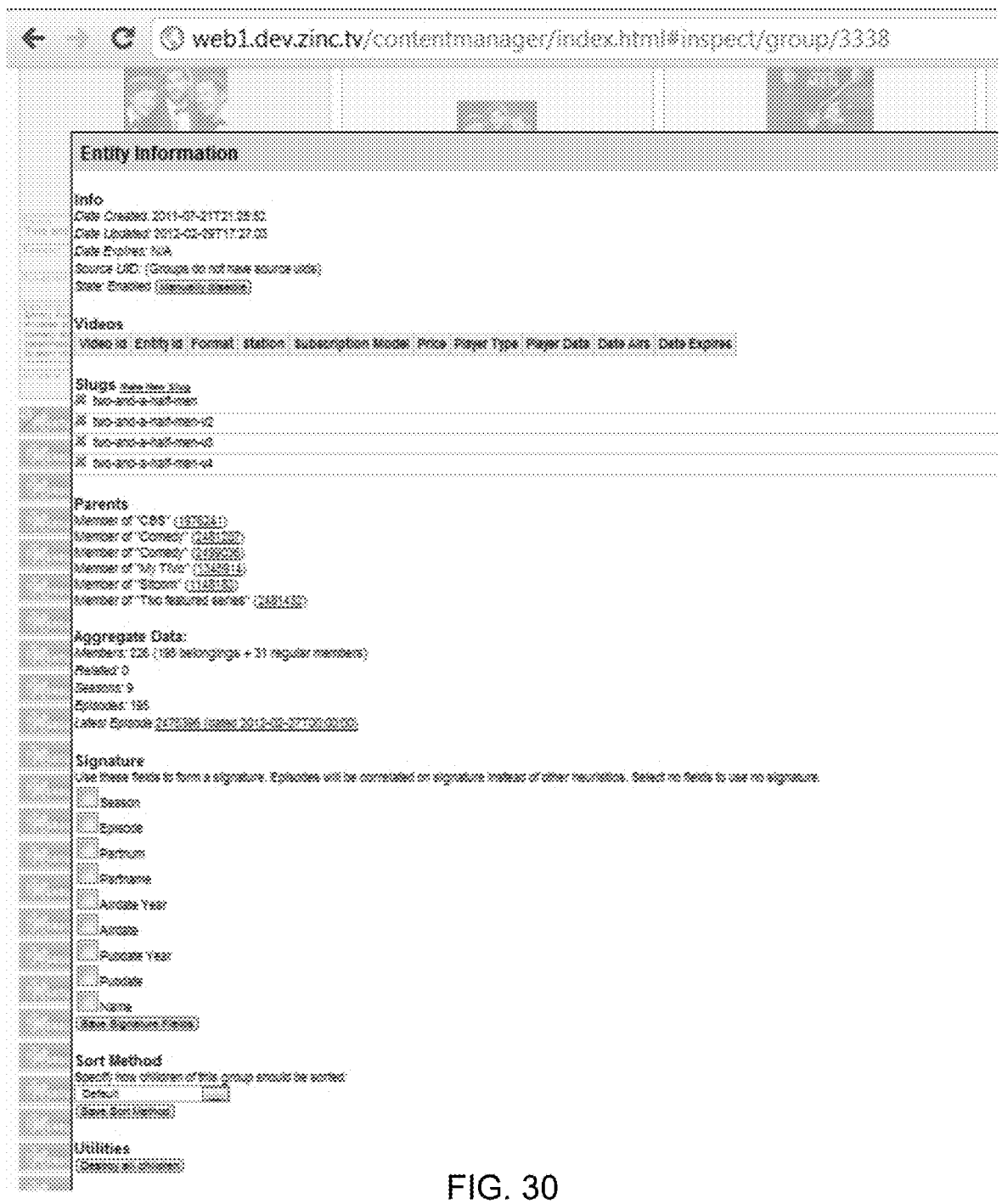
FIG. 30 shows and administrator interface to specify correlation rules for specific shows or other groups of content.
Figure 31:
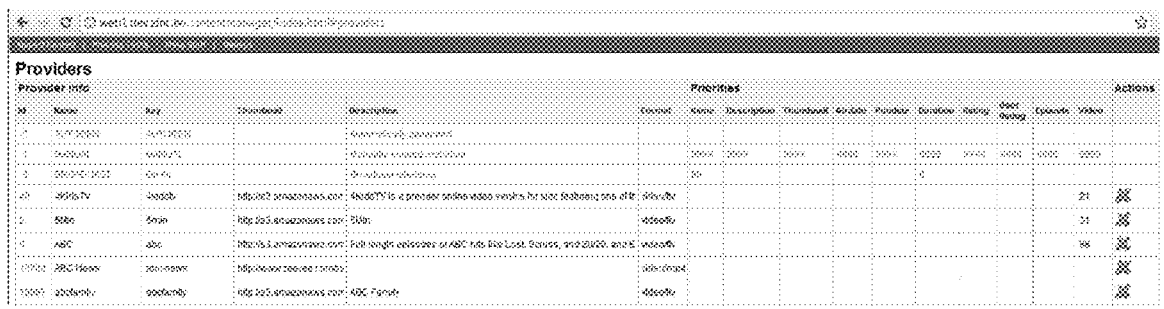
FIG. 31 shows an administrator interface to configure priorities of sources to use for metadata displayed about content.

In addition to tasks to identify content correlation, server administrators may manually edit content metadata stored in the database. FIGS. 28 and 29 shows such manual editing. Controls available to administrators include Add a New Member (create a collection), Add Related Content, Manually Over-ride, Join with Another Member (exact match correlation), Break Correlation, Delete, and View the User Version (what the user sees). This allows administrator control to override software defaults, alter what is displayed to users, and correct any incorrect correlation information. It also allows administrators to create groupings or relationships to show topics of interest, such as hot-news topically relevant content. FIG. 30 shows administrator controls to override correlation rules for specific shows or other groups of content. FIG. 31 shows an administrator interface for configuration of priorities for sources of metadata. Priority determines which source is used for default metadata to present to users. A '0' priority indicates not to display metadata from that source, even if the only source with any metadata for specific content.

Other Embodiments

In addition to content listings, control of playback through the device-unified interface may allow for synchronized playback of content on multiple devices. This could be desirable for remote instruction, meetings with discussion, or chatting about the currently playing content. Synchronizing playback allows all viewers to ensure they are at the same point in the content as other viewers. In addition to productive business or education purposes, programs being currently viewed may be listed to be seen by the public or closed lists such as friends lists. This allows users to check what other users are viewing, which may be useful in selecting content to consume.

In addition to restrictions based on subscriptions, paid or free content, device accessible formats, and user selection of content provider channels, further restrictions for sorting and displaying content may be configured. For example, geographical information may be included with content. Some content is geographically restricted, such as for access only within a specific country or region. Additionally, geographical content may map directly to language of the content. As users and devices move location, which content they can access may change. Integration with location-aware information, such as GPS information included with some mobile phones or computing devices, may be transmitted from the device to allow accurate display of geographically restricted content. As with other selections, users may configure the interface to display all content regardless of geographical restriction, display only content accessible based on current region, or a display a hybrid with inaccessible content listed but grayed out.

In another alternative embodiment, the interface and/or content listings may be tailored to a specific platform or access provider. For example, all subscribers to a specific cable content provider may receive accounts tailored to that cable content provider. Content from the cable content provider may be highlighted or listed above other content when available. Additionally, subscriptions through the cable content provider may be automatically mapped to each user's account. For example, subscribing to HBO through a standard cable content provider may automatically update the user's account to allow access and display listings for online content from HBO. Accounts from users which have no subscriptions beyond their cable content provider may be completely tailored to match their cable subscriptions by default. Platforms and access providers may also use the system to sell online or web-based subscriptions to premium content, or automatically include it as a benefit of existing subscriptions.

Business rules may be configured which apply to all users accessing the interface through an access provider. For example, the list of available content providers may be limited by a business rule, such as "display all content providers except Amazon and Netflix." As another example, a business rule may be added to modify content search results to only show content listings from the access provider's content if there are any matches from the access provider or an access provider affiliate in the search results, or to only show content listings from all other sources if there are no matches from the access provider in the search results. In addition to business rules, the platform server may provide a custom feed of content listings and search results for use within an access provider's interface. Metadata containing multi-provider listings and results may be delivered from the platform server to the access provider for display in any form by the access provider. For example, a specific access provider may have content deals with specific sources and set priorities accordingly to display only metadata from the specific sources. Such business rules may be altered on a content or content-group specific basis by administrators. Additionally, the platform server may also deliver an interface to users with the interface styled to match the logo and colors, or look and feel, of the access provider. A standard HTML or compatible thin client interface may be provided for rendering on televisions and devices served by the access provider. For performance or ease of management, a separate platform server may be configured and operated for each access provider. Platform server may be implemented as a cloud service and operated as multiple servers within a cloud platform allowing dynamic growth and expandability in relation to performance needs.

In another alternative embodiment, the media accessed through the platform server is limited to video-only content. In another alternate embodiment, the media is limited to audio-only content.

Figure 32:
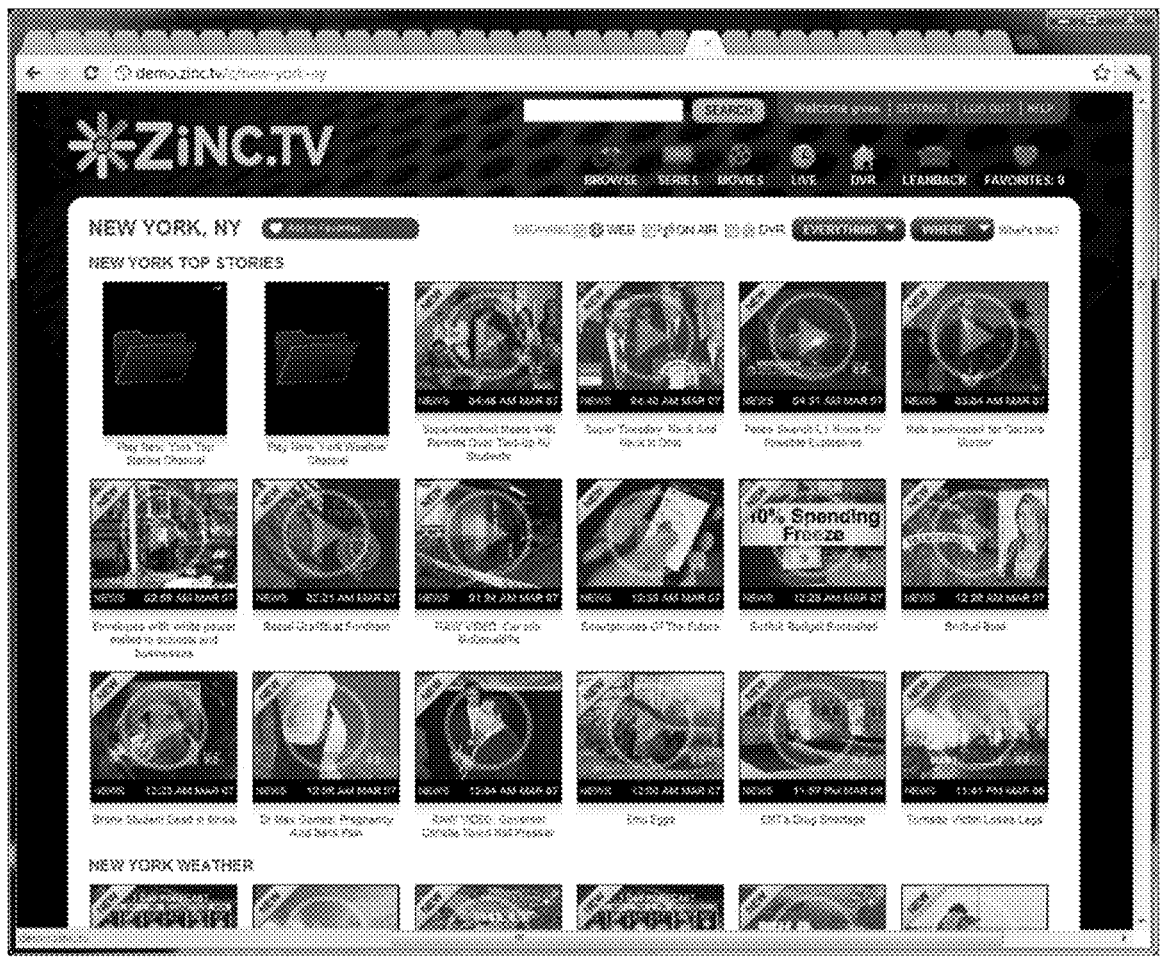
FIG. 32 shows a user interface collecting content for sequential playback.

In addition using user queues to automatically play content, users may select or create channels of content for autoplay. For example, news or weather clips available online may be played sequentially to create a news channel, with one clip playing immediately after the prior clip. FIG. 32 shows a user interface for searching and selecting clips to sequentially play.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of listing video content, comprising:
    collecting, on a network-connected computer server, metadata describing content listings from disparate video sources, including accessing local devices and receiving information from content provider servers;
    categorizing the content listings based on the collected metadata;
    generating a first set of content listings by:
        merging multiple content listings describing a same content into a single content merged listing; and
        cross-correlating related content listings;
    receiving one or more inputs identifying devices at which a user consumes media content, the devices including at least a first device and a second device;
    for each device in the identified devices, determining which of the contents described in the first set of content listings are available at the device, wherein not all content described in the available content listings is available on all of the devices; and
    causing displaying, on a network-connected device, the available content listings based on the categorizing, the available content listings including at least the first set of content listings, the available content listings describing content that is available at the first device, but not the second device, as well as content that is available at the second device, but not the first device.

2. The method of claim 1, wherein collecting comprises accessing listings from online websites and further comprises a server communicating with one or more of the identified devices to access video on demand and/or linear programming listings that are available through the one or more of the identified devices instead of the online websites.

3. The method of claim 1, wherein collecting comprises a server communicating with one or more of the devices to retrieve listings of content stored privately and/or locally at the one or more of the devices.

4. The method of claim 1, further comprising graying out listing information for content which is not available to a particular device of the identified devices.

5. The method of claim 1, further comprising indicating whether content described by the available content listings is available on the web, over live television, and/or through a local storage device.

6. The method of claim 1, further comprising including icons as part of each content listing displayed, coloring a first icon to indicate that the network-connected device has access to a corresponding first content item, and graying out a second icon to indicate that a corresponding second content item is not available to the network-connected device.

7. The method of claim 1, further comprising including icons as part of each content listing displayed, coloring a first icon to indicate a corresponding first content item is available on a selected device, other than the network-connected device, and graying out a second icon to indicate that a second content item is not available on the selected device.

8. The method of claim 1, further comprising displaying, for a selected content listing, grayed icons to indicate that the selected content is not available but similar content is available through the web, over live television, or through a local storage device.

9. The method of claim 1, further comprising displaying, after selection of a single content listing, a play button to begin video play on a selected device when specific content corresponding to the single content listing is available for the selected device.

10. The method of claim 1, further comprising identifying multiple selected devices at which specific content is available, and after selection of a single content listing corresponding to the specific content, causing synchronized playback of the specific content on the identified multiple selected devices.

11. The method of claim 1, wherein merging further comprises identifying identical content from multiple sources based on heuristics applied to metadata, and system administrator determination where heuristics are inconclusive.

12. The method of claim 1, further comprising:
    receiving, at the network-connected device, a request to play a particular content item in the available content listings that is not available on the network-connected device, wherein the network-connected device is not the first device; and
    in response to the request received at the network-connected device, causing the first device to play the particular content item.

13. The method of claim 9, further comprising collecting a set of content that plays sequentially, creating a continuous stream of video from separate content items.

14. A non-transitory computer-readable medium storing one or more sequences of instructions which, when executed by one or more processors, cause the one or more processors to carry out the steps of:
    collecting, on a network-connected computer server, metadata describing content listings from disparate video sources, including accessing local devices and receiving information from content provider servers;
    categorizing the content listings based on the collected metadata;
    generating a first set of content listings by:
        merging multiple content listings describing a same content into a single merged listing; and
        cross-correlating related content listings;
    receiving one or more inputs identifying devices at which a user consumes media content, the devices including at least a first device and a second device;
    for each device in the identified devices, determining which of the contents described in the content listings are available at the device, wherein not all content described in the available content listings is available on all of the devices; and
    causing displaying, on a network-connected device, the available content listings based on the categorizing, the available content listings including at least the first set of content listings, the available content listings describing content that is available at the first device, but not the second device, as well as content that is available at the second device, but not the first device.

15. The computer-readable medium of claim 14, wherein the steps further comprise graying out listing information for content which is not available to a particular device of the identified devices.

16. The computer-readable medium of claim 14, wherein the steps further comprise displaying icons as part of each content listing displayed, coloring a first icon to indicate that a corresponding first content item is available on a selected device, other than the network-connected device, and graying out a second icon to indicate that a second content item is not available on the selected device.

17. The computer-readable medium of claim 14, wherein the steps further comprise displaying, after selection of a single content listing, a play button to begin video play on a selected device when specific content corresponding to the single content listing is available for the selected device.

18. The computer-readable medium of claim 14, wherein the steps further comprise:
receiving, at the network-connected device, a request to play a particular content item in the available content listings that is not available on the network-connected device, wherein the network-connected device is not the first device; and
in response to the request received at the network-connected device, causing the first device to play the particular content item.

19. The computer-readable medium of claim 14, wherein collecting comprises accessing listings from online websites and further comprises a server communicating with one or more of the identified devices to access video on demand and/or linear programming listings that are available through the one or more of the identified devices instead of the online websites.

20. The computer-readable medium of claim 14, wherein collecting comprises a server communicating with one or more of the devices to retrieve listings of content stored privately and/or locally at the one or more of the devices.

21. The computer-readable medium of claim 17, wherein the steps further comprise identifying multiple selected devices at which specific content is available, and after selection of a single content listing corresponding to the specific content, causing synchronized playback of the specific content on the identified multiple selected devices.

22. The computer-readable medium of claim 17, wherein the steps further comprise collecting a set of content which plays sequentially, creating continuous stream of video from separate content items.

23. An apparatus comprising:
logic implemented at least partially in hardware, configured to collecting metadata describing content listings from disparate video sources, including accessing local devices and receiving information from content provider servers;
logic, implemented at least partially in hardware, configured to categorize the content listings based on the collected metadata;
logic, implemented at least partially in hardware, configured to generate a first set of content listings by:
merging multiple content listings describing a same content into a single merged listing; and
cross-correlating related content listings;
logic, implemented at least partially in hardware, configured to receive one or more inputs identifying devices at which a user consumes media content, the devices including at least a first device and a second device;
logic, implemented at least partially in hardware, configured to, for each device in the identified devices, determine which of the contents described in the content listings are available at the device, wherein not all content described in the available content listings is available on all of the devices; and
logic, implemented at least partially in hardware, configured to cause displaying, on a network-connected device, the available content listings based on the categorizing, the available content listings including at least the first set of content listings, the available content listings describing content that is available at the first device, but not the second device, as well as content that is available at the second device, but not the first device.

24. The apparatus of claim 23, further comprising logic, implemented at least partially in hardware, configured to gray out listing information for content which is not available to a particular device of the identified devices.

25. The apparatus of claim 23, further comprising:
logic, implemented at least partially in hardware, configured to display icons as part of each content listing displayed, coloring a first icon to indicate that a corresponding first content item is available on a selected device, other than the network-connected device;
logic, implemented at least partially in hardware, configured to gray out a second icon to indicate that a second content item is not available on the selected device.

26. The apparatus of claim 23, further comprising:
logic, implemented at least partially in hardware, configured to receive, at the network-connected device, a request to play a particular content item in the available content listings that is not available on the network-connected device, wherein the network-connected device is not the first device; and
logic, implemented at least partially in hardware, configured to, in response to the request received at the network-connected device, cause the first device to play the particular content item.

27. The apparatus of claim 23, wherein collecting comprises accessing listings from online websites and further comprises a server communicating with one or more of the identified devices to access video on demand and/or linear programming listings that are available through the one or more of the identified devices instead of the online websites.

28. The apparatus of claim 23, wherein collecting comprises a server communicating with one or more of the devices to retrieve listings of content stored privately and/or locally at the one or more of the devices.

29. The apparatus of claim 25, further comprising logic, implemented at least partially in hardware, configured to display, after selection of a single content listing, a play button to begin video play on a selected device when specific content corresponding to the single content listing is available for the selected device.

30. The apparatus of claim 25, further comprising logic, implemented at least partially in hardware, configured to identify multiple selected devices at which specific content is available, and after selection of a single content listing corresponding to the specific content, causing synchronized playback of the specific content on the identified multiple selected devices.

31. The apparatus of claim 14, further comprising logic, implemented at least partially in hardware, for collecting a set of content which plays sequentially, creating continuous stream of video from separate content items.

* * * * *